Feb. 14, 1939.  G. O. PEARSON  2,147,054
ATTACHABLE SLEEVE FOR SHIRTS
Filed Jan. 7, 1938
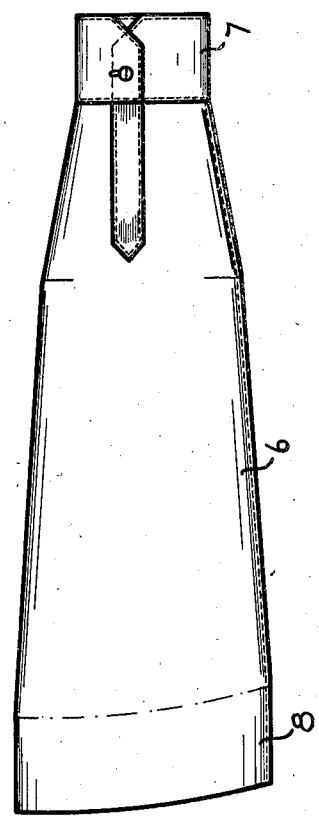
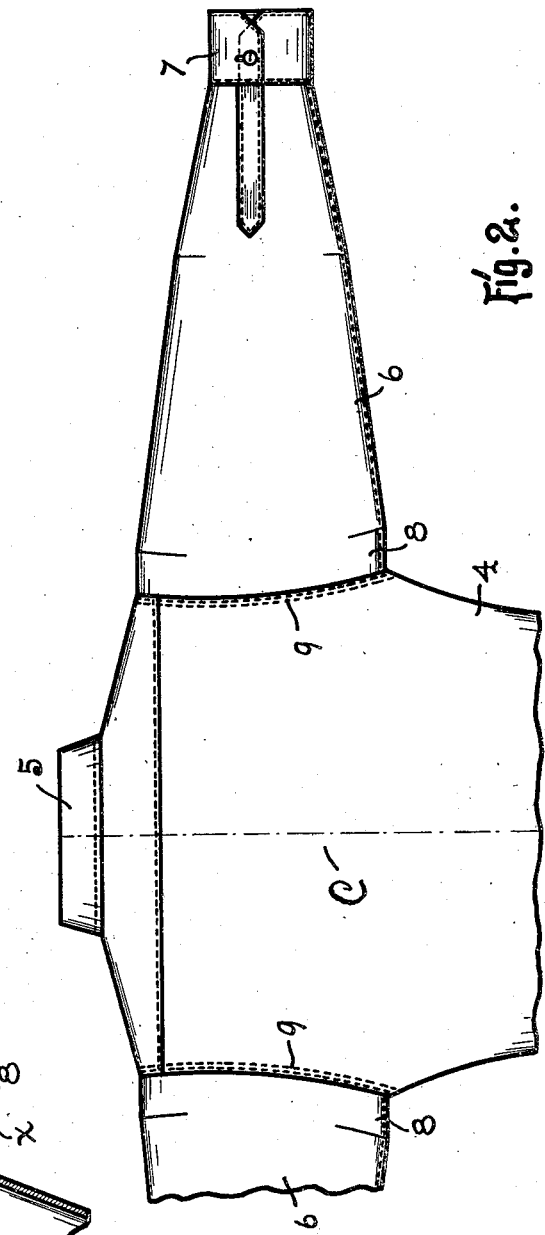
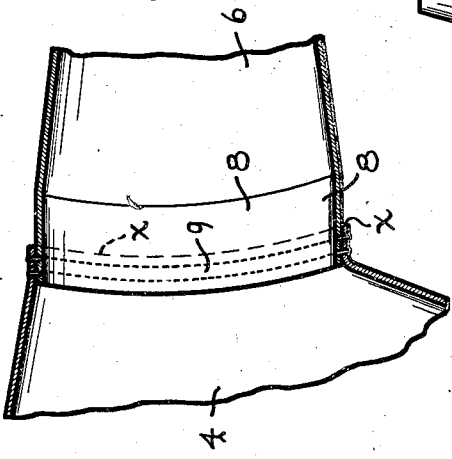
Inventor
By Glenn O. Pearson
Hiram A. Sturges Attorney Patented Feb. 14, 1939

2,147,054

UNITED STATES PATENT OFFICE 2,147,054

ATTACHABLE SLEEVE FOR SHIRTS

Glenn O. Pearson, Omaha, Nebr.

Application January 7, 1938, Serial No. 183,818

1 Claim. (Cl. 2—125)

This invention relates to an improvement in garments, and specifically to attachable sleeves for shirts.

It is well known that men's shirts, for the most part, are furnished to the trade as a "ready made" product.

In the purchase of a shirt by an individual, the size of the collar is generally an arbitrary matter, and on account of differences in physical development of individuals, a plurality of shirts must be kept in stock by the merchant corresponding to the size of the collars. For instance, some individuals of a class who wear No. 16 collars may require a sleeve-length of only 30 inches while 32 or 34 inches of sleeve-length may be required by the others of said class.

Therefore a merchant, in order to supply the trade must generally keep in stock a plurality of shirts corresponding to the several numbers which designate sizes of collars. By use of the present invention a retail merchant may be relieved from keeping an excess of stock. Also the practice of the present invention will prove to be an advantage to the manufacturer for the reason that the sleeves manufactured will be simplified and less expensive. Also the invention will prove to be of advantage to the purchaser for the reason that the sleeve-length will be exact and correct.

The invention includes the method of production and also the product, and consists of the new and useful construction, combination and arrangement of parts as described herein and claimed, and as illustrated in the accompanying drawing, it being understood that changes may be made in form, size, proportions and minor details, said changes being within the scope of the invention as claimed.

In the accompanying drawing, Fig. 1 is a plan or side view of an attachable shirt sleeve.

Fig. 2 is a sectional view showing a terminal part of a shirt sleeve attached to the body of the shirt.

Fig. 3 is a broken away view showing the rear part of a shirt body and position of sleeves when attached thereto. The invention broadly, consists of sleeves provided with extensions for measured adjustments when attached to a shirt body.

Referring now to the drawing for a more particular description, numeral 4 indicates the body of a shirt provided with a collar 5, the sleeves being indicated at 6 and provided with cuffs 7.

Shirt sleeves generally are of tapered form from their junction with the shoulder-portions to their free ends, and in accordance with this invention each sleeve is provided with an extension 8, best shown in Fig. 1 of the drawing, the width or proportions of said extension corresponding approximately to that of the terminal $x$ (Fig. 3) which defines the opening at the shoulder and which receives the end of the sleeve.

By means of the extensions 8 the sleeves 6 may be conveniently adjusted to a selected length, even to the fractional part of an inch, so that they will conform to a desired length.

It is obvious that if sleeves are too short they will not protect the wrists, and if the sleeves are of undue length they may quickly become soiled. Also one arm of an individual, occasionally, is of greater length than the other arm, and in such instances the use of the invention may be of great advantage.

The length of the extensions 8 in all instances is sufficient to provide sleeves of adequate length after adjustments have been made.

In accordance with the invention sleeveless body-portions 4 with collars 5 bearing the usual numbering as to size, are manufactured, and separate sleeves are manufactured in pairs, and when a purchaser selects a shirt provided with a collar of a required size, a pair of sleeves having a size of the parts 8 corresponding to that of the openings $x$ of the shoulder-portions of the shirt-body are selected, and the extensions of the sleeves, or so much thereof as may be necessary are inserted within the opening $x$ and by means of rows of stitches 9 the extensions 8 are secured to the body of the shirt, accurate measurements being made so that the length of the sleeves will correctly fit the wearer.

It will be appreciated by merchants that only a fractional part of the number of shirts will be necessary to be kept in stock, in the use of the invention.

Also, since the sleeves of shirts generally become worn and require mending before other parts thereof, the present method as described, will prove to be of great advantage for the reason that these attachable sleeves may be kept separately in stock and may be readily substituted therefor.

It is believed that the practice of the invention will cause no inconvenience at the factory or to the merchant as compared with former methods in the handling or sale of the product.

The shirts are folded and packed and delivered in the usual way, each shirt-body being accompanied with a pair of sleeves, and preferably, the sleeves may be basted in position in the openings $x$. When making a sale of a shirt, a measurement may be made of the individual to ascertain the distance from the line c (Fig. 2) to a selected part of the wrist (not shown), and in accordance with this measurement the sleeves are secured to the body of the shirt by the rows of stitches mentioned, this latter operation requiring only a short delay and resulting in a satisfactory sleeve-length to the purchaser.

I claim as my invention:

The herein described attachble sleeves and a shirt comprising, in combination with a body having sleeve openings in the shoulder-portions, a pair of tapered sleeves each provided with an extension at its end of greater width adapted to be inserted a seletced distance into an opening of a shoulder-portion, each extension being of uniform width throughout its length, and the measurement of each extension, transversely of a sleeve, corresponding to the measurement of the sleeve at a terminal thereof, and stitching-means for securing said extensions to the shoulder-portions of said body.

GLENN O. PEARSON.